(12) United States Patent
Williams

(10) Patent No.: US 12,722,683 B2
(45) Date of Patent: Sep. 1, 2026

(54) RUNNER ASSEMBLY FOR UTILITY WAGON

(71) Applicant: Erwin B. Williams, Blythewood, SC (US)

(72) Inventor: Erwin B. Williams, Blythewood, SC (US)

( * ) Notice: Subject to any disclaimer, the term of this patent is extended or adjusted under 35 U.S.C. 154(b) by 301 days.

(21) Appl. No.: 18/431,363

(22) Filed: Feb. 2, 2024

(65) Prior Publication Data

US 2025/0249948 A1 Aug. 7, 2025

(51) Int. Cl.
*B62B 19/02* (2006.01)

(52) U.S. Cl.
CPC .................................... *B62B 19/02* (2013.01)

(58) Field of Classification Search
CPC ..................................................... B62B 19/02
See application file for complete search history.

(56) References Cited

U.S. PATENT DOCUMENTS 964,537 A * 7/1910 Nelson .................... B62B 19/02 280/13
2,419,422 A 4/1947 Schulein
3,927,894 A 12/1975 Zawislak
4,291,891 A 9/1981 Blanchette
4,493,492 A 1/1985 Balabanova
4,618,157 A 10/1986 Resnick
4,790,559 A 12/1988 Edmonds
5,413,361 A * 5/1995 Mosher ................... B62B 19/02 280/8
5,427,390 A * 6/1995 Duncan ................... B62B 19/02 280/47.38
6,824,148 B1 * 11/2004 Key ........................ B62B 19/02 280/13
2004/0061294 A1 * 4/2004 Flanigan, Jr. ........... B62B 19/02 280/8
2013/0277925 A1 * 10/2013 Bysiewicz ............. B62B 19/02 29/428
2024/0124045 A1 * 4/2024 Walsh ..................... B62B 19/02
2024/0227908 A1 * 7/2024 Naylor .................... B62B 19/02

* cited by examiner

*Primary Examiner* — Erez Gurari
(74) *Attorney, Agent, or Firm* — P. Jeff Martin; The Law Firm of P. Jeffrey Martin, LLC

(57) ABSTRACT

A runner assembly for attachment to a utility cart or wagon. The assembly includes a mounting portion, a runner portion, and a hinge portion, wherein the hinge portion mutually couples the mounting portion with the runner portion. The hinge portion includes mechanical stop(s) to fix the position and/or angle between the mounting portion and the runner portion. The runner portion may include one or more recesses for supporting a wheel. A recess may be longitudinal in orientation. Another recess may be transversal in orientation.

18 Claims, 11 Drawing Sheets

RUNNER ASSEMBLY FOR UTILITY WAGON

I. RELATED APPLICATIONS

Figure 1:
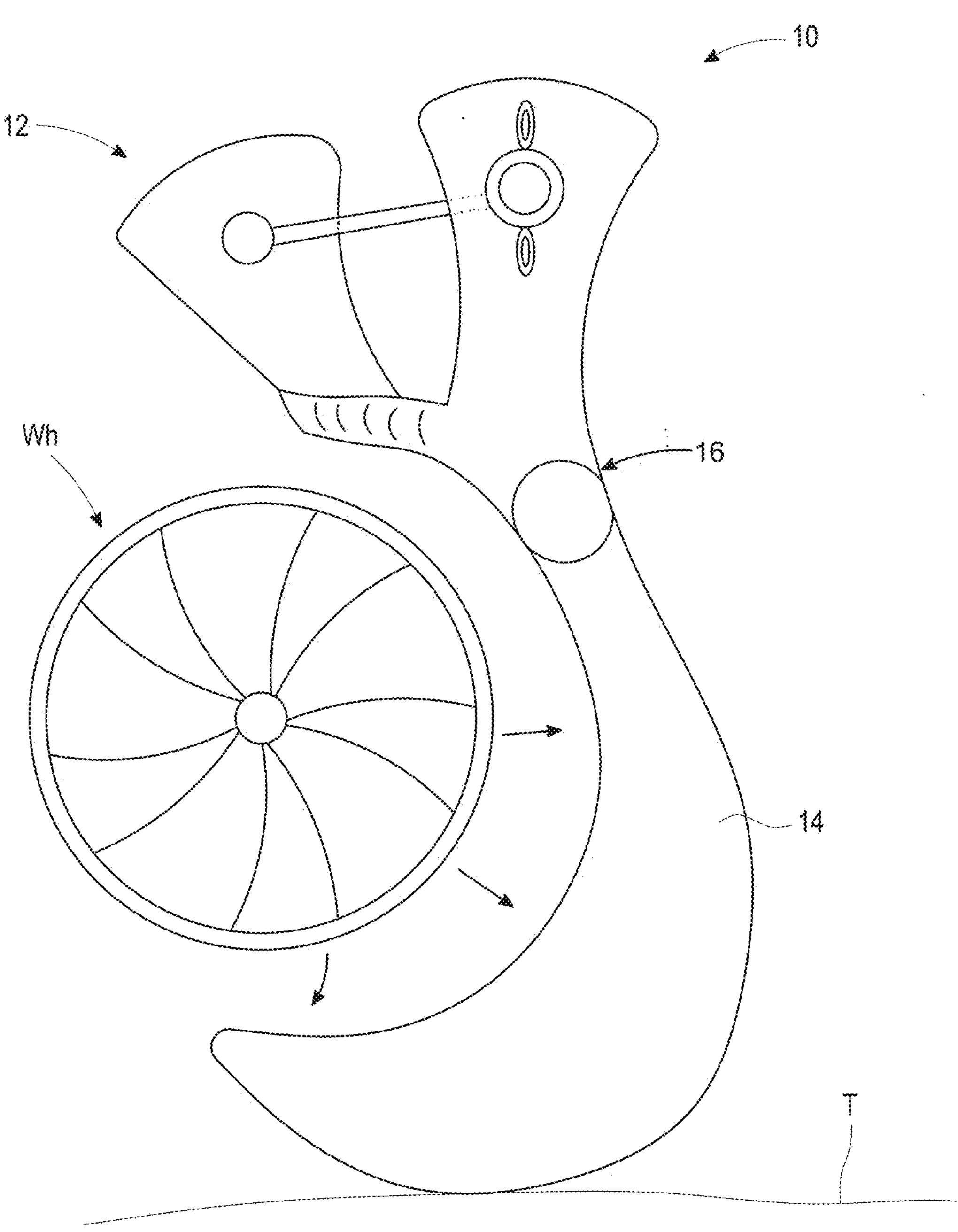

There are no previously filed, nor currently any co-pending applications, anywhere in the world.

II. FIELD OF THE INVENTION

The present application discloses claims and embodiments generally related to a recreational utility wagon, and more particular, a runner assembly for a recreational utility wagon for facilitating locomotion over difficult terrain.

III. BACKGROUND OF THE INVENTION

Numerous attempts have been made to improve locomotion of hand-drawn or hand-pulled/pushed utility carts or wagons. With individual interests in articles and items for use at a beach or a similar type of terrain (e.g., snow), the desire for transporting such articles and items in a manner that is efficient and without significant physical strain is felt. Accordingly, a need exists for an improved utility cart or wagon adapted and configured to facilitate smooth transport through sand, mud, snow and through or over other terrain.

Although not exhaustive, the following references serve as a representation of the improvements in such hand-drawn or hand-pulled/pushed utility carts or wagons:

- U.S. Pat. No. 4,618,157, issued to Resnick, discloses a collapsible hand truck for carrying supplies across a beach which includes wheels independently mounted on raised front tips of skis; Resnick teaches wheel mounting hardware 7 secures wheel axle 9 to front end of ski 6 which is notched 10;
- U.S. Pat. No. 4,291,891, issued in the name of Blanchette, discloses a sled for use on snow and other surfaces, wherein the sled includes a pair of runners rigidly secured to the underside thereof and three pivotal wheels; an operating lever is used to pivot the wheels between a first ground-engaging position with the runners off the ground, and a second inoperative retracted position relative to the runner; Blanchette teaches the use of pivoting wheels 18 and not pivotally-adjustable runners, as taught by the present invention;
- U.S. Pat. No. 4,790,559, issued to Edmonds, discloses a collapsible carrier for transporting implements or goods over paved or sand surfaces which includes a horizontal frame mounted on wheels, a handle pivotally attached to one end of the frame, and a slider device carried on the underside of the frame opposite the handle; Edmonds teaches the single slider plate 34 is mounted to the base frame 12 via an axle 13, the slider 34 is fixedly mounted to the base frame 12;
- U.S. Pat. No. 3,927,894, issued to Zawislak, a sled that may be used for the transportation of packages on sand or on snow that may also be rolled over solid ground, the sled is in the form of a U-shaped section of sheet material, with sides, that is fastened at each end to a set of handle frames, and a set of wheels is mounted on one side of the U-shaped section for use in riding over solid ground, with the sled reversed to slide on its other side over snow or sand;
- U.S. Pat. No. 4,493,492, issued in the name of Balabanova, discloses a foldable multifunctional carriage, particularly for use in performing cleaning and maintenance tasks in hospitals, of the type comprising rollers on which are mounted a rigid portion and a foldable framework which can be placed either in an operative unfolded position or in an inoperative folded position, wherein the carriage is characterized in that said rigid portion consists of a chassis 2 horizontally resting on said rollers 3, and in that said framework 1 has a pair of arms 4, 5 pivotally mounted on a front portion of said chassis 2, a U-shaped frame 7 being pivotally mounted between said pair of arms so as to form a strut adapted to abut against a stop 12 integrally formed with said chassis 2 to secure said framework 1 in its unfolded position, said pair of arms 4, 5 carrying, therebetween, if desired, one or more support members 8, 36, 37 for articles or utensils to be carried on the carriage; and
- U.S. Pat. No. 2,419,422, issued in the name of Schulein, contemplates characterizing the new and improved adjustable moving device for luggage, and the like, by the fact that it includes a plate-like undercarriage for resting on and being moved along the ground, with the undercarriage be supported on casters or wheels, and a back is hingedly mounted on the undercarriage for folding flat against said undercarriage and for assuming an erect position.

Despite these efforts, shortcomings still persist. Easily transporting a large number of items and/or expensive pieces of equipment used for recreational activity remains a challenge.

Accordingly, there is a continued need for improvements in this industry.

This application presents claims and embodiments that fulfill a need or needs not yet satisfied by the products, inventions, systems, and methods previously or presently available. In particular, the claims and embodiments disclosed herein describe a runner assembly, the runner assembly comprising a mounting segment adapted for removable attachment to a wheel assembly of a utility cart; a runner segment adapted for displacing terrain and promoting forward locomotion of the utility cart; and an adjustment segment pivotally coupling the mounting segment and the runner segment, the runner assembly providing unanticipated and nonobvious combination of features distinguished from the products, devices, apparatuses, inventions, systems, and methods preexisting in the art. The applicant is unaware of any device, apparatus, method, system disclosure or reference that discloses the features of the claims and embodiments disclosed herein.

IV. SUMMARY OF THE INVENTION

Generally, a runner assembly removably attachable to the wheel assembly of a utility cart of utility wagon, such as those used for transporting beach gear (e.g., towels, umbrella, body boards). The runner assembly is attached to the cart or wagon so that the runner body supports the wheel above and displaces loose terrain below. A hinge fixes the relative position of the mount body to the runner body.

According to one embodiment, a runner assembly receives a wheel of a utility cart, and the assembly comprises mounting means adapted for removable attachment to a wheel assembly of the utility cart, runner means adapted for displacing terrain and promoting forward locomotion of the utility cart, and adjustment means mutually coupling the mounting means and the runner means, wherein adjustment means comprises a locking mechanism for positioning and repositioning the runner means relative to the mounting means.

In accordance to another embodiment, a runner assembly receives a wheel of a utility cart, and the assembly comprises a mounting segment coupling the runner assembly to a wheel assembly of the utility cart, a runner segment having a curvilinear body adapted for displacing terrain and promoting forward locomotion of the utility cart, and a hinge segment mutually coupling the mounting segment and the runner segment, wherein the hinge segment comprises a mechanical stop for positioning and repositioning the runner segment relative to the mounting segment.

In accordance to still another embodiment, the runner assembly is coupled with a utility cart. In such an embodiment, a utility cart has at least one front wheel, and the at least one front wheel coupled to the cart frame by a vertical wheel shaft (or strut), the utility cart comprising a runner assembly, the utility cart with runner assembly comprises a mounting segment having means for coupling the runner assembly with the wheel shaft, a runner segment having a curvilinear body, the curvilinear body comprising a curvilinear fin adapted for displacing loose terrain and promoting forward locomotion of the utility cart, and a hinge segment mutually coupling the mounting segment and the runner segment.

V. BRIEF DESCRIPTION OF THE DRAWING(S)

Figure 1A:
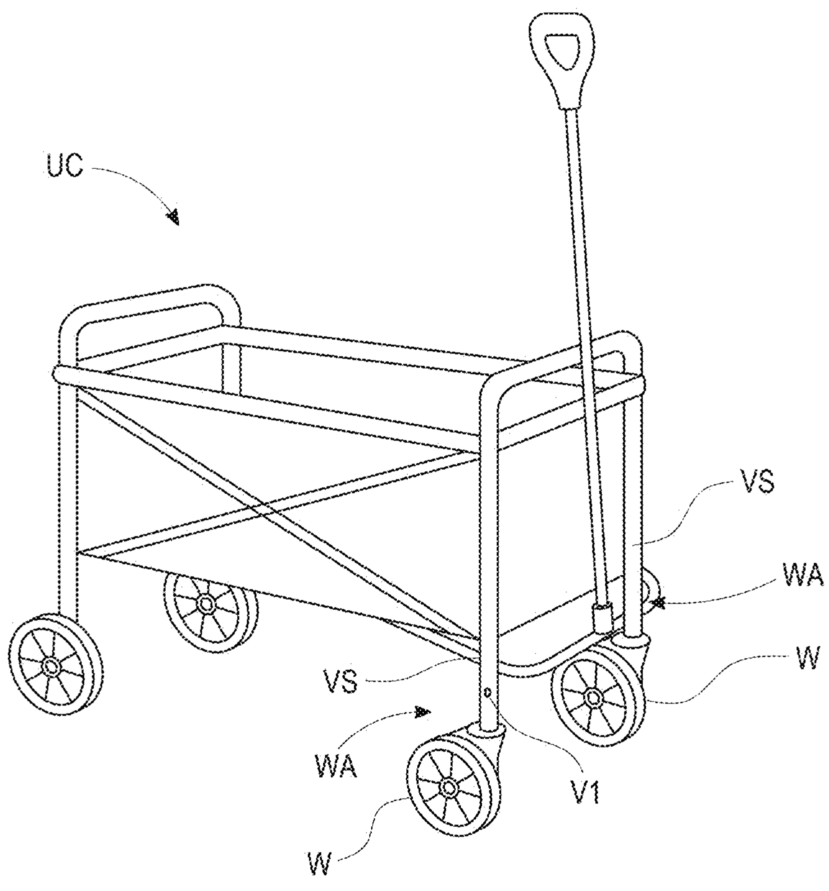
Figure 1B:
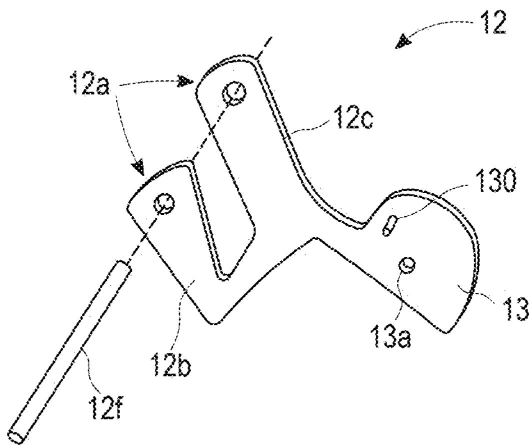
Figure 1C:
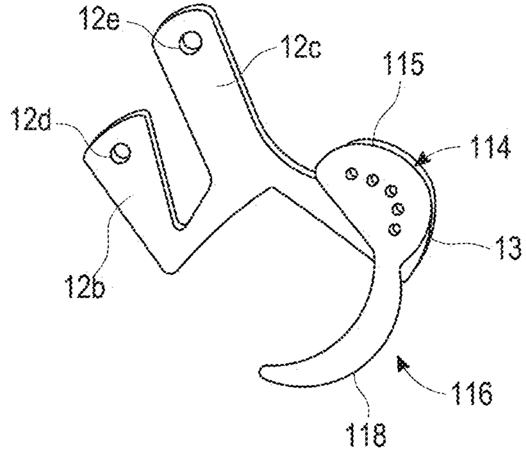
Figure 1D:
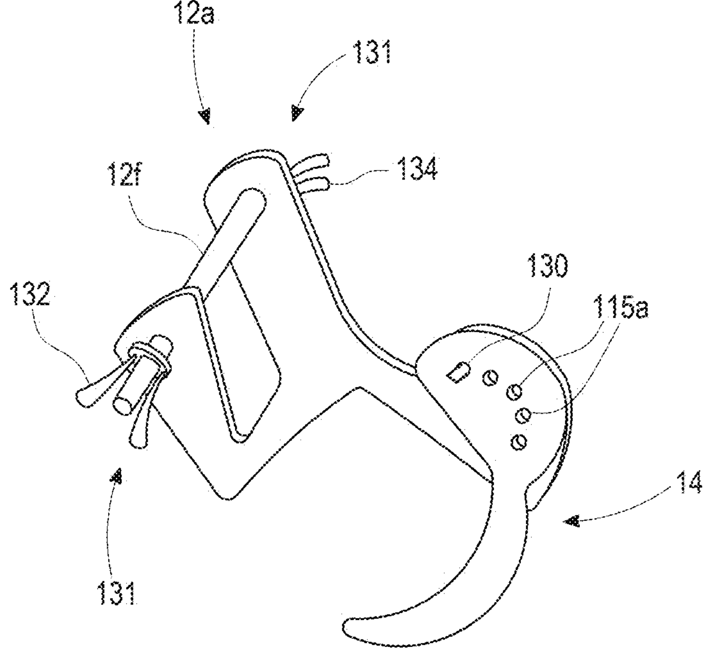
Figure 1E:
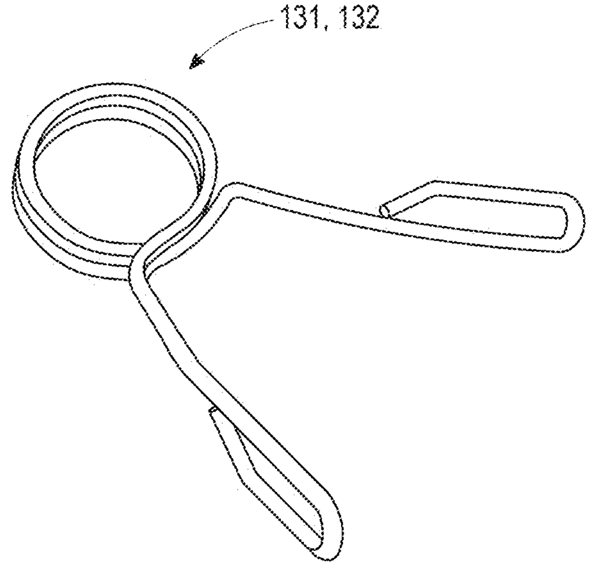
Figure 1F:
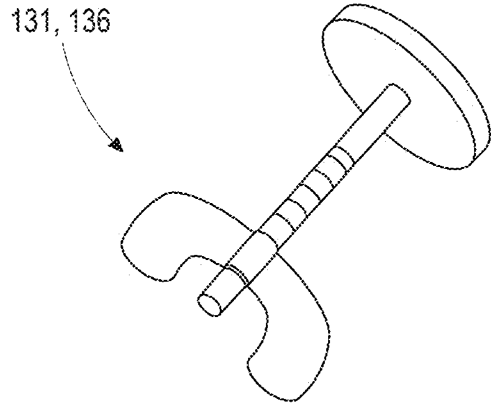
Figure 1G:
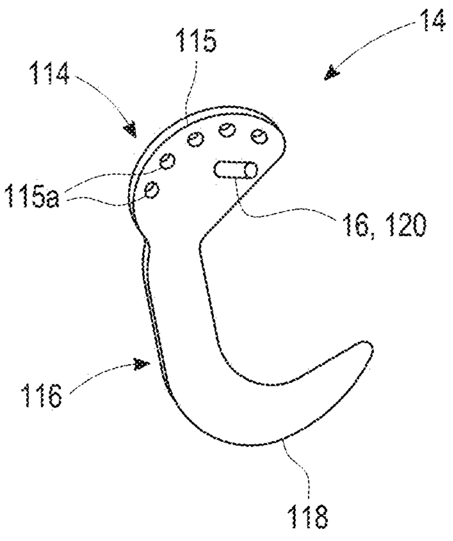
Figure 2:
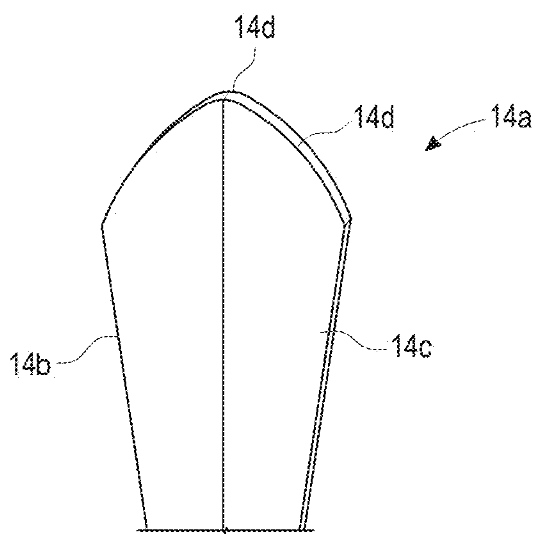
Figure 2A:
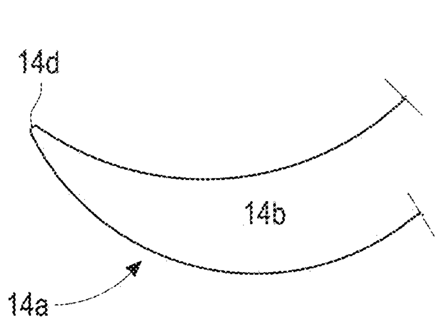
Figure 3:
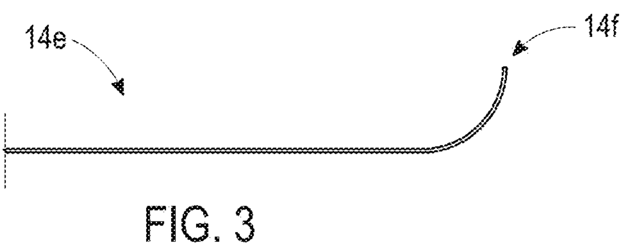
Figure 3A:
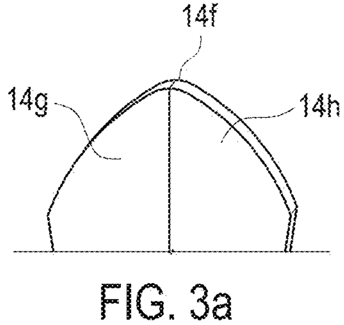
Figure 4:
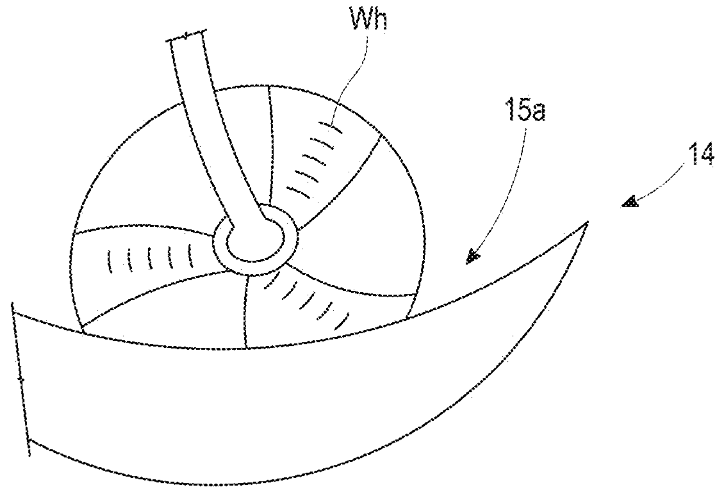
Figure 4A:
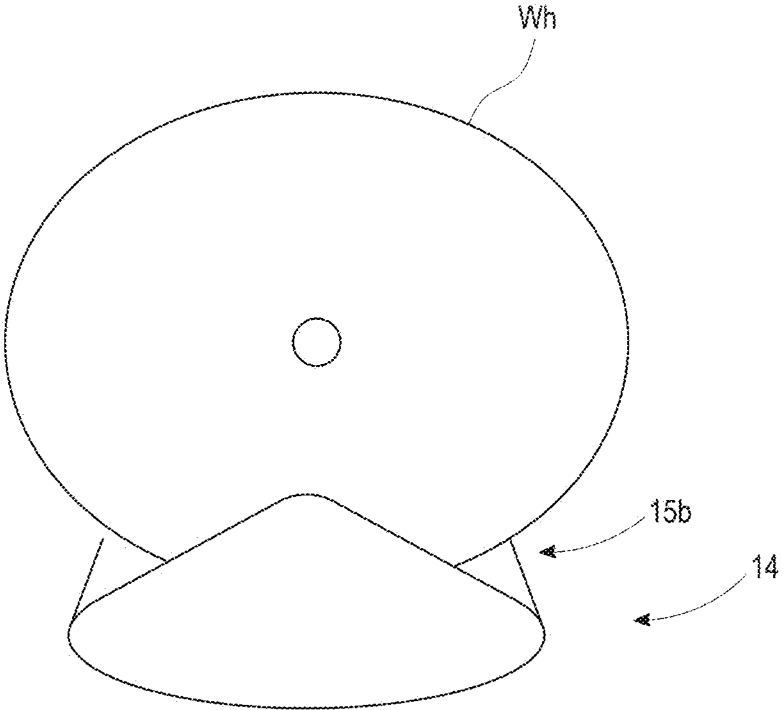
Figure 4B:
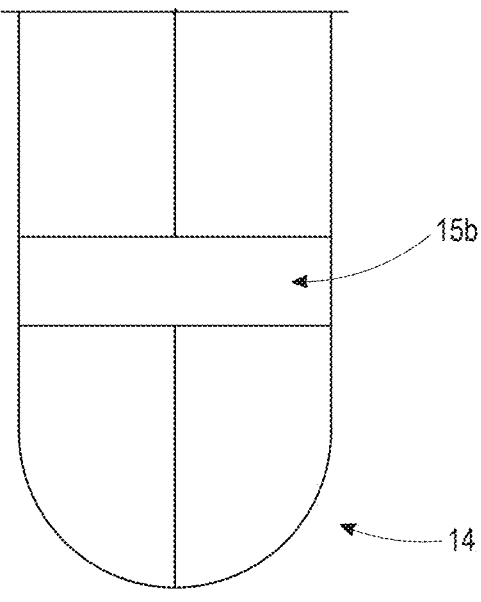

The advantages and features of the present invention will become better understood with reference to the following more detailed description and claims taken in conjunction with the accompanying drawings, in which like elements are identified with like symbols, and in which:

FIG. 1 is a perspective view of a runner assembly;

FIG. 1*a* depicts a right, front perspective view of an exemplary conventional utility cart or wagon;

FIG. 1*b* is a perspective view of a mounting segment, in accordance to one embodiment of the present invention;

FIG. 1*c* is a perspective view showing the runner segment pivotally secured to the mounting segment, in accordance to one embodiment of the present invention;

FIG. 1*d* is a side elevational view of the mounting segment showing a pair of clamps clamped to opposed ends of an axle, in accordance to one embodiment of the present invention;

FIG. 1*e* illustrates an exemplary fastening means in the form of a clamp for detachably securing the mounting segment to the strut of a utility cart, in accordance to one embodiment of the present invention;

FIG. 1*f* illustrates an exemplary fastening means for detachably securing the mounting segment to the strut of a utility cart, in accordance to another embodiment of the present invention;

FIG. 1*g* is a bottom view of the runner segment showing the pivot pin extending perpendicularly from the head thereof, in accordance to one embodiment of the present invention;

FIG. 2 is a top rear view of one embodiment of the runner segment;

FIG. 2*a* is a side view of FIG. 2;

FIG. 3 is a side view of an alternative embodiment of the runner segment;

FIG. 3*a* is a rear view of the interior front of the embodiment in FIG. 3;

FIG. 4 is a side view of the runner segment having a longitudinal recess for supporting a utility cart wheel;

FIG. 4*a* is a front view facing toward the rear of the runner segment of FIG. 4 having a transversal recess for supporting a utility cart wheel;

FIG. 4*b* is a top view of the runner segment with transversal recess as depicted in FIG. 4*a;*

Figure 5:
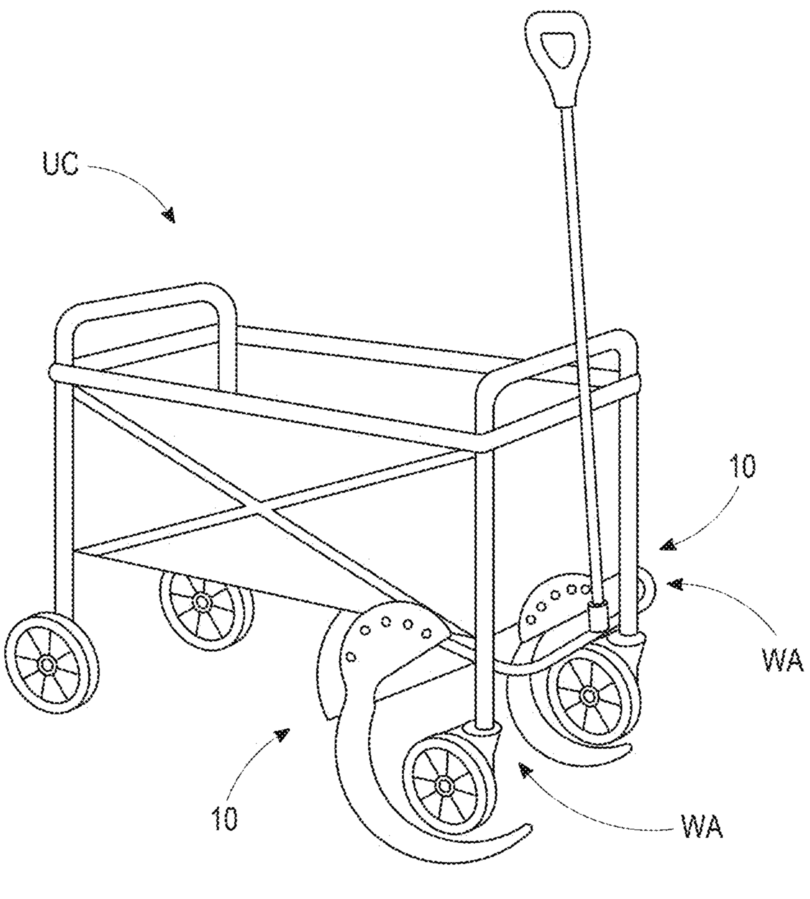
Figure 5A:
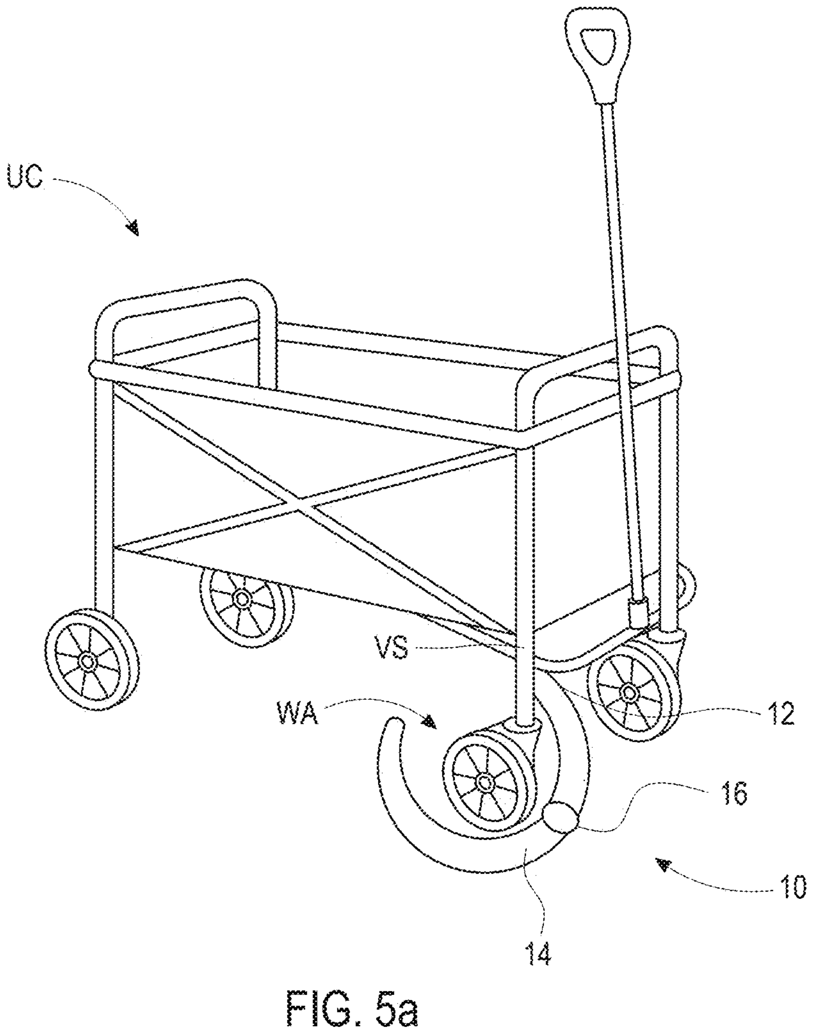

FIG. 5 is a right, front perspective view of a conventional utility cart shown with a runner assembly installed in a forward orientation on both front wheel assemblies thereof, in accordance to one embodiment of the present invention; and FIG. 5*a* is a right, front perspective view of a conventional utility cart showing the runner assembly secured in a rearward orientation to a right, front right vertical strut adjacent a wheel of the cart, in accordance to another embodiment of the present invention.

VI. DESCRIPTION OF THE EMBODIMENT(S)

It will be readily understood that the components of the present invention, as generally described and illustrated in the figures herein, may be arranged and designed in a wide variety of different configurations. Thus, the following detailed description of the embodiments, as represented in the attached figures, is not intended to limit the scope of the invention as claimed, but is merely representative of selected embodiments of the invention.

The features, structures, or characteristics of the invention described throughout this specification may be combined in any suitable manner in one or more embodiments. For example, the usage of the phrases "example embodiments", "some embodiments", or other similar language, throughout this specification refers to the fact that a particular feature, structure, or characteristic described in connection with the embodiment may be included in at least one embodiment of the present invention. Thus, appearances of the phrases "example embodiments", "in some embodiments", "in other embodiments", or other similar language, throughout this specification do not necessarily all refer to the same group of embodiments, and the described features, structures, or characteristics may be combined in any suitable manner in one or more embodiments.

Referring now to FIGS. 1-1*a*, a runner/ski/glide assembly 10 is described and disclosed, wherein the assembly 10 may be mounted to a utility cart UC or wagon and facilitate locomotion across difficult terrain T, such as sand, mud, snow, and the like. For a utility cart UC or wagon having a single front wheel (Wh), the assembly 10 comprises a mounting segment 12 and a runner segment 14, the mounting segment 12 and runner segment 14 mutually coupled about an adjustable segment 16 or adjustable means. For a utility cart UC or wagon having multiple front wheels W and/or multiple rear wheels W, such as the utility cart UC depicted in FIG. 1*a*, the assembly 10 may be multiplied to equal the number of wheels W provided on the cart UC or wagon, wherein each assembly 10 is substantially identical with the exception of orientation and appearance relative to left and/or right side placement and forward and/or rearward orientation.

The mounting segment 12 is coupled or affixed to an area adjacent the wagon or cart's wheel W. The mounting segment 12 may comprise a variety of components and/or combinations of components and/or mechanisms. In one embodiment, the mounting segment 12 includes a clam-shell enclosure 12*a* comprising a pair of upwardly-projecting, spaced arms 12*b* and 12*c* each having an aperture 12*d*, 12*e*, respectively, defined therethrough. The apertures 12*d* and 12*e* are linearly-aligned for receiving an axle 12*f*. The clam-shell enclosure 12*a* is closed about a vertical shaft or strut VS of the utility wagon/cart UC wheel W. The axle 12*f* is inserted through the aperture 12*d* of arm 12*b*, through the strut VS (via a hole V1 defined therethrough), and through the aperture 12*e* of arm 12*c*. The mounting segment 12 is detachably secured to the strut VS via a fastening means 131, such as a pair of clamps 132, 134. The pair of clamps 132, 134 are clamped to respective ends of the axle 12*f*.

As previously disclosed, the runner assembly 10 may be multiplied to equal the number of wheels W provided on the utility cart UC or wagon, wherein each assembly 10 is substantially identical with the exception of orientation and appearance relative to left and/or right side placement. More specifically, the runner assembly 10 embodiment depicted in FIGS. 1*b*-1*e* is ideally suited for detachable securement to the left, front vertical strut VS of a utility cart UC. A mirror image of the runner assembly 10 embodiment depicted in FIGS. 1*b*-1*e* would be ideally suited for detachable securement to the right, front vertical strut VS of a utility cart UC.

In accordance with another embodiment, the clam-shell enclosure 12*a* may be closed about the vertical shaft or strut VS of the wagon/cart UC wheel W, with the enclosure 12*a* having a snap or impingement fit for securing the enclosure 12*a* in position. An arcuate-shaped plate 13 projects integrally outward from a lower end of the clam-shell enclosure 12*a*.

In another embodiment, the mounting segment 12 may comprise a snap-ring, a screw-cam, a threaded fastener 136 (as illustrated in FIG. 1*f*), or other similar means and mechanisms for affixing the mounting segment 12 so that the runner segment 14 is properly aligned spatially with the wheel W.

Consistent with FIGS. 1, 1*b*-1*g*, 2, 2*a*, 3, 3*a*, and 5, the runner segment 14 pivotally depends from the arcuate-shaped plate 13 of the mounting segment 12 via the adjustable segment 16. In particular reference to FIG. 5, a conventional utility cart UC is shown with the runner assembly 10 installed in a forward orientation on both front vertical struts VS of the cart UC. FIG. 5*a* depicts a conventional utility cart UC having the runner assembly 10 secured in a rearward orientation to a right, front vertical strut of the cart UC.

The runner segment 14 may comprise a variety of arrangements. In accordance to one embodiment, the runner segment 14 comprises an upper portion 114 comprising an arcuate-shaped head 115 and a lower portion 116 comprising a ski structure 118, the ski structure 118 downwardly depending integrally from the arcuate-shaped head 115. The runner segment 14 is pivotally coupled to the arcuate-shaped plate 13 of the mounting segment 12 via the adjustable segment 16, the adjustable segment 16 comprising a pivot pin 120 (as shown in FIG. 1*g*). The pivot pin 120 extends perpendicularly from a bottom side of the head 115 of the runner segment 14, wherein the pivot pin 120 extends through a hole 13*a* defined in the plate 13 of the mounting segment 12. Positioned adjacent the hole 13*a* in the plate 13, an outwardly-biased, retractable pin 130 extends perpendicularly from the plate 13. Being pivotally coupled to the plate 13 of mounting segment 12 enables the runner segment 14 to pivot clockwise and counterclockwise about the plate 13.

The head 115 of the runner segment 14 includes a series of equispaced holes 115*a* defined therethrough in an arched pattern, wherein the series of equispaced holes 115*a* are aligned and adapted to mate with the outwardly-biased pin 130 of the plate 13 as the runner segment 14 is pivoted clockwise and counterclockwise about the plate 13, thereby allowing for selectively-adjustable, fixed pivotal positioning of the ski structure 118 about the plate 13 of the mounting segment 12, and thus enabling the ski structure 118 to be oriented spatially below the wheel W in a terrain T engaging position, as best illustrated in FIG. 1.

In another embodiment, the runner segment 14 comprises an angled fin 14*a* including a first fin 14*b* and a second fin 14*c* coupled together to form the angled fin 14*a* and terminating in a fin edge 14*d* that curves or bends upward relative to the first fin 14*b* and second fin 14*c* bodies. In this configuration, the fin 14*a* and its elements are enabled to plow soft terrain T such as sand, loose dirt, mud, snow, and the like, and/or glide over terrain T with a more firm texture, including tall grasses and the like. In another embodiment, the runner segment 14 comprises a ski or glide 14*e* structure having an upward-bending front tip 14*f*. In another embodiment, the ski or glide 14*e* structure may include a first member 14*g* and a second member 14*h* coupled together to form the front tip 14*f*. Other embodiments are envisioned that promote the runner segment 14 displacing the underlying terrain T in a manner that allows the wagon/cart UC to move through the medium without significant impediment.

Consistent with FIGS. 4, 4*a*, and 4*b*, the runner segment 14 may further include one or more recesses to improve placement and support of each wheel W. In one embodiment, the runner segment 14 includes a curvilinear fin 14*a* that comprises a recess 15*a* disposed longitudinally between the front tip and the opposing rear tail. In another embodiment, the runner segment 14 includes a curvilinear fin 14*a* comprises a recess 15*b* disposed transversally between the front tip and the opposing rear tail. It is envisioned that the longitudinal recess 15*a* is of sufficient length and width to accommodate variously sized wheels in width and diameter. It is envisioned that the transversal recess 15*b* is of sufficient width to accommodate variously sized wagon/cart UC wheels W in width and diameter, with the preference for turning the wheel W perpendicular (90 degrees) away from a standard wheel alignment. By placing the wheel W into the transversal recess 15*b*, greater stability may be achieved by inhibiting much of the reciprocating motion of the wheel W that may be experienced during transport of the cart UC or wagon using the assembly 10. In combination with an adjustable hinge segment 16, whereby the positioning between the mounting segment 12 and the runner segment 14 may be fixed into a variety of positions and/or angles, the user may be able to achieve optimal stability by adjusting the positioning of the runner segment 14 to optimize the vertical disposition of the wheel W and its assembly WA and minimizing the amount of stress or strain placed on the wheel W and wheel assembly WA of the cart UC or wagon as motion is imparted through the transport thereof.

The adjustable segment 16 couples the mounting segment 12 and runner segment 14 to one another. The adjustable segment 16 may comprises a variety of components and/or combinations of components. In particular, it is envisioned that the adjustable segment 16 may include an adjustable hinge 16*a* wherein the angle formed between the mounting segment 12 and runner segment 14 may be fixed into an orientation and/or position. The hinge 16*a* may be secured via a variety of mechanisms, including one or more adjustable threaded fasteners, a spring-biased stop, or other similar means. Other means for coupling and providing adjustable positioning of the runner segment 14 relative to the mounting segment 12 include catches, latches, and/or ratchets, either individually or in combination.

In use, the assembly 10 may be mounted to each wheel W or wheels W provided on the utility cart UC or wagon. In such an embodiment, the cart UC or wagon may have one or more wheels W supported by the assembly 10 in a manner that provides a gliding or sliding effect to facilitate transport of the cart UC or wagon. In this manner, the runner 14 element displaces the loose or compacted terrain T so as to facilitate the gliding or sliding and obviating the challenge of rotating a wheel with weight into a terrain T that is incapable of providing the proper horizontal stability and traction. Accordingly, the assembly 10 will displace the terrain T as necessary and glide/slide upon the compacted surface(s) remaining to facilitate the desired locomotion.

It is to be understood that the embodiments and claims are not limited in its application to the details of construction and arrangement of the components set forth in the description and illustrated in the drawings. Rather, the description and the drawings provide examples of the embodiments envisioned, but the claims are limited to the specific embodiments. The embodiments and claims disclosed herein are further capable of other embodiments and of being practiced and carried out in various ways. Also, it is to be understood that the phraseology and terminology employed herein are for the purposes of description and should not be regarded as limiting the claims.

Accordingly, those skilled in the art will appreciate that the conception upon which the application and claims are based may be readily utilized as a basis for the design of other structures, methods, and systems for carrying out the several purposes of the embodiments and claims presented in this application. It is important, therefore, that the claims be regarded as including such equivalent constructions.

Furthermore, the purpose of the foregoing Abstract is to enable the U.S. Patent and Trademark Office and the public generally, and especially including the practitioners in the art who are not familiar with patent and legal terms or phraseology, to determine quickly from a cursory inspection the nature and essence of the technical disclosure of the application. The Abstract is neither intended to define the claims of the application, nor is it intended to be limiting to the scope of the claims in any way. It is intended that the application is defined by the claims appended hereto.

What is claimed is:

1. A runner assembly receiving a wheel of a utility cart, the runner assembly comprising:

a mounting segment adapted for removable attachment to one or more wheel assemblies of the utility cart; and a runner segment adapted for displacing terrain and promoting forward locomotion of the utility cart, wherein the runner segment comprises a head having a bottom side from which a pivot pin extends perpendicularly therefrom, and wherein the pivot pin extends through a hole defined in the mounting segment, thereby pivotally coupling the runner segment to the mounting segment and enabling the runner segment to be pivotally positioned relative to the mounting segment.

2. The runner assembly of claim 1, wherein the mounting segment comprises a clam-shell enclosure and an arcuate-shaped plate projecting integrally outward from a lower end of the clam-shell enclosure, the arcuate-shaped plate comprises an outwardly-biased, retractable pin extending perpendicularly therefrom, wherein the clam-shell enclosure comprises a pair of upwardly-projecting, spaced arms each having an aperture, respectively, defined therethrough, and wherein the apertures of the spaced arms are linearly-aligned for receiving the mounting segment, the mounting segment comprises an axle.

3. The runner assembly of claim 2, wherein the mounting segment is detachably secured to one or more vertical struts of the one or more wheel assemblies of the utility cart via a fastening means.

4. The runner assembly of claim 3, wherein the fastening means comprises a pair of clamps, the pair of clamps are clamped to respective ends of the axle.

5. The runner assembly of claim 1, wherein the runner segment comprises an upper portion comprising an arcuate-shaped head, and a lower portion comprising a ski structure, the ski structure downwardly depending integrally from the arcuate-shaped head.

6. The runner assembly of claim 5, wherein the arcuate-shaped head of the runner segment includes a series of equispaced holes defined therethrough in an arched pattern, wherein the series of equispaced holes are aligned and adapted to mate with an outwardly-biased pin of the mounting segment as the runner segment is pivoted clockwise and counterclockwise about the mounting segment, thereby allowing for selectively-adjustable, fixed pivotal positioning of the ski structure about the mounting segment, and thus enabling the ski structure to be oriented spatially below the wheel of the utility cart in a terrain T engaging position.

7. The runner assembly of claim 1, wherein the runner segment comprises a curvilinear fin having a front tip and an opposing rear tail, wherein the curvilinear fin supports the wheel of the utility cart.

8. The runner assembly of claim 7, wherein the curvilinear fin comprises a recess disposed longitudinally between the front tip and the opposing rear tail.

9. The runner assembly of claim 7, wherein the curvilinear fin comprises a recess disposed transversally between the front tip and the opposing rear tail.

10. A runner assembly receiving a wheel of a utility cart, the runner assembly comprising:

a mounting segment coupling the runner assembly to at least one wheel assembly of the utility cart, wherein the mounting segment comprises a clamping enclosure;

a runner segment having a curvilinear body adapted for displacing terrain and promoting forward locomotion of the utility cart; and a hinge segment mutually coupling the mounting segment and the runner segment, wherein the hinge segment comprises a fastening means for pivotally coupling the runner segment to the mounting segment, thereby enabling pivotal positioning and repositioning of the runner segment relative to the mounting segment.

11. The runner assembly of claim 10, wherein the curvilinear body of the runner segment comprises a curvilinear fin having a front tip and an opposing rear tail.

12. The runner assembly of claim 11, wherein the curvilinear fin supports the wheel of the utility cart.

13. The runner assembly of claim 12, wherein the curvilinear fin comprises a recess disposed longitudinally between the front tip and the opposing rear tail.

14. The runner assembly of claim 12, wherein the curvilinear fin comprises a recess disposed transversally between the front tip and the opposing rear tail.

15. The runner assembly of claim 10, wherein the fastening means comprises a threaded bolt and wing nut in fluid communication with the runner segment and the mounting segment to apply and release mechanical tension therebetween.

16. A utility cart comprising:

at least one front wheel, the at least one front wheel coupled to a cart frame of the utility cart by a wheel shaft;

a runner assembly;

a mounting segment comprising a clamping enclosure for coupling the runner assembly with the wheel shaft;

a runner segment having a curvilinear body, the curvilinear body comprising a curvilinear fin adapted for displacing loose terrain and promoting forward locomotion of the utility cart, wherein the curvilinear fin of the curvilinear body of the runner segment comprises a front tip and an opposing rear tail; and a hinge segment mutually coupling the mounting segment and the runner segment, wherein the hinge segment comprises an adjustable segment for positioning and repositioning the runner segment relative to the mounting segment.

17. The utility cart of claim 16, wherein the curvilinear fin comprises a recess disposed longitudinally between the front tip and the opposing rear tail.

18. The utility cart of claim 16, wherein the adjustable segment comprises a threaded bolt and wing nut in fluid communication with the runner segment and the mounting segment to apply and release mechanical tension therebetween.

* * * * *